United States Patent [19]
Ornberg

[11] Patent Number: 6,158,322
[45] Date of Patent: Dec. 12, 2000

[54] SAW ASSEMBLY

[75] Inventor: Rolf Ornberg, Röke, Sweden

[73] Assignee: Hultdin System AB, Mala, Sweden

[21] Appl. No.: 09/424,219

[22] PCT Filed: May 22, 1998

[86] PCT No.: PCT/SE98/00961

§ 371 Date: Nov. 19, 1999

§ 102(e) Date: Nov. 19, 1999

[87] PCT Pub. No.: WO98/53666

PCT Pub. Date: Dec. 3, 1998

[30] Foreign Application Priority Data

May 29, 1997 [SE] Sweden .................................. 9702022

[51] Int. Cl.[7] .............................. B26D 1/46; B26D 5/12; B26D 7/26; B27B 17/08; B27B 17/12
[52] U.S. Cl. .................................. 83/796; 83/72; 83/169; 83/603; 144/34.1; 144/356
[58] Field of Search .......................... 83/796, 928, 795, 83/797, 798, 564, 169, 72; 144/4.1, 34.1, 356

[56] References Cited

U.S. PATENT DOCUMENTS

| | | | |
|---|---|---|---|
| 3,279,508 | 10/1966 | Ehlen et al. | 83/169 X |
| 3,565,138 | 2/1971 | Albright | 144/34.1 X |
| 3,604,479 | 9/1971 | Jordan | 83/796 X |
| 3,789,279 | 1/1974 | Dempsey et al. | 83/72 X |
| 4,221,245 | 9/1980 | Wildey | 144/34.1 |
| 4,848,424 | 7/1989 | Wiemeri et al. | 83/796 X |
| 4,901,612 | 2/1990 | Harris | 83/796 X |
| 5,143,131 | 9/1992 | Seigneur et al. | 83/169 X |
| 5,802,946 | 9/1998 | Leini | 144/34.1 X |
| 5,845,402 | 12/1998 | Leini | 83/169 X |
| 5,884,545 | 3/1999 | Hamby, Jr. | 83/796 X |
| 6,041,683 | 3/2000 | Timperi et al. | 83/796 X |

FOREIGN PATENT DOCUMENTS

WO 93/23218  11/1993  WIPO .

OTHER PUBLICATIONS

Derwent's Abstract of SU 818558, Apr. 7, 1981.
Derwent's Abstract of SU 904591, Feb. 15, 1982.
Derwent's Abstract of SU 843859, Jul. 7, 1981.
Derwent's Abstract of SU 1605156, Nov. 7, 1990.

*Primary Examiner*—Rinaldi I. Rada
*Assistant Examiner*—Charles Goodman
*Attorney, Agent, or Firm*—Nixon & Vanderhye P.C.

[57] ABSTRACT

A saw assembly for a grip-harvester has a saw chain running around a bar and a chain sprocket; a bar holder pivotably journalled on the saw assembly stand; a saw motor driving the chain sprocket; and a device for feeding a bar out and in. The feeding-out and feeding-in device preferably is a hydraulic cylinder mounted on the stand and having a piston rod. The movements of the piston rod are transmitted to the pivotable bar holder by means of a pivotably journalled first toothed wheel which is joined to the bar holder and has a toothed wheel rim cooperating with the piston rod which is in the form of a rack. The saw assembly is also provided with a device for sensing and recording the angular position of the saw bar in relation to an initial position, which device has a smaller second toothed wheel in engagement with the first larger toothed wheel of the feeding-out and feeding-in device, and also at least one sensor which senses a tooth gap or a tooth on the second toothed wheel.

18 Claims, 8 Drawing Sheets

SAW ASSEMBLY

CROSS REFERENCE TO RELATED APPLICATION

This application is a U.S. national phase of international application No. PCT/SE98/00961 filed May 22, 1998.

BACKGROUND AND SUMMARY OF THE INVENTION

The present invention relates to a saw assembly for a grip-harvester, comprising a stand; a bar; a saw chain running around the bar and a chain sprocket; a bar holder pivotably journalled on the stand; a saw motor driving the chain sprocket; and a feeding-out and feeding-in device for feeding the bar out and in to perform a sawing operation, said feeding-out and feeding-in device comprising a hydraulic cylinder mounted on the stand and having a piston rod, and connection means to transmit the movements of the piston rod to the pivotable bar holder.

In previously used saw assemblies of the type described in the introduction the mechanical connection for transmitting the movement of the hydraulic cylinder to the bar holder is constructed of movable parts and these can therefore be subjected to external influence causing damage to the connection, or snow and ice may collect around the connection thus deteriorating or completely destroying its function. In certain cases special guides are also required for the piston rod, to take up the radial forces this is subjected to during said transmission of movement. The known saw assemblies have no efficient device for sensing and recording the angular position and direction of movement of the saw bar in relation to its home position. Without such efficient device it is impossible to arrange an efficient marking system to colour-mark a sawn cut surface, for instance, in conjunction with the actual sawing operation.

The object of the present invention is to considerably reduce the problems mentioned above and provide a simplified saw assembly which lacks movable parts between the piston rod and the element which is caused to rotate and comprises the bar holder, and which saw assembly can be provided with an efficient device for sensing and recording angular position and direction of movement of the saw bar so it is also possible to make use of an efficient marking system. This is enabled while still retaining the dimensions of the saw assembly, or even with reduced dimensions.

The saw assembly according to the invention is characterized in that said connection means comprises a toothed wheel pivotably journalled in the stand, which toothed wheel is coaxially, rigidly joined to the bar holder and is provided with a toothed wheel rim or a sector of a toothed wheel rim situated on a level with and facing the piston rod, in that the piston rod is in the form of a rack with teeth facing the toothed wheel and in engagement with the teeth on the rim or the rim sector, in that the saw assembly comprises a device for sensing and recording the angular position of the saw bar in relation to an initial position, which device comprises a toothed wheel in toothed engagement with the toothed wheel of the feeding-out and feeding-in device and is smaller than the toothed wheel so that a gear ratio >1 is obtained between the larger toothed wheel and the smaller toothed wheel, and also a sensor which, in an initial position of the saw bar, is situated immediately opposite a gap between two teeth or immediately opposite a tooth in said smaller toothed wheel.

BRIEF DESCRIPTION OF THE DRAWINGS

The invention will be described in more detail with reference to the drawings.

DETAILED DESCRIPTION OF THE DRAWINGS

Figure 1:
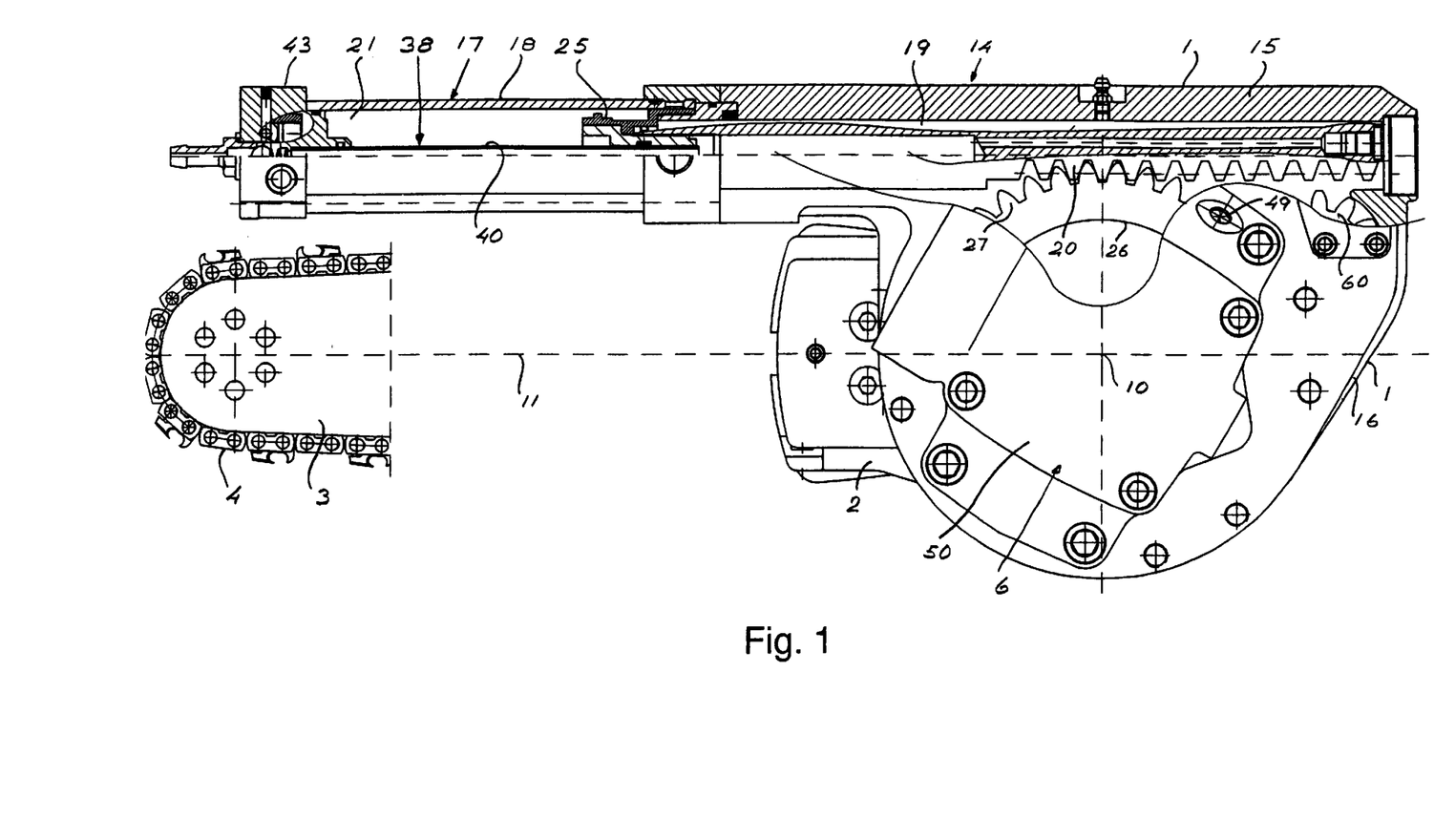
FIG. 1 shows schematically from above parts of a saw bar, partially in section.
Figure 2:
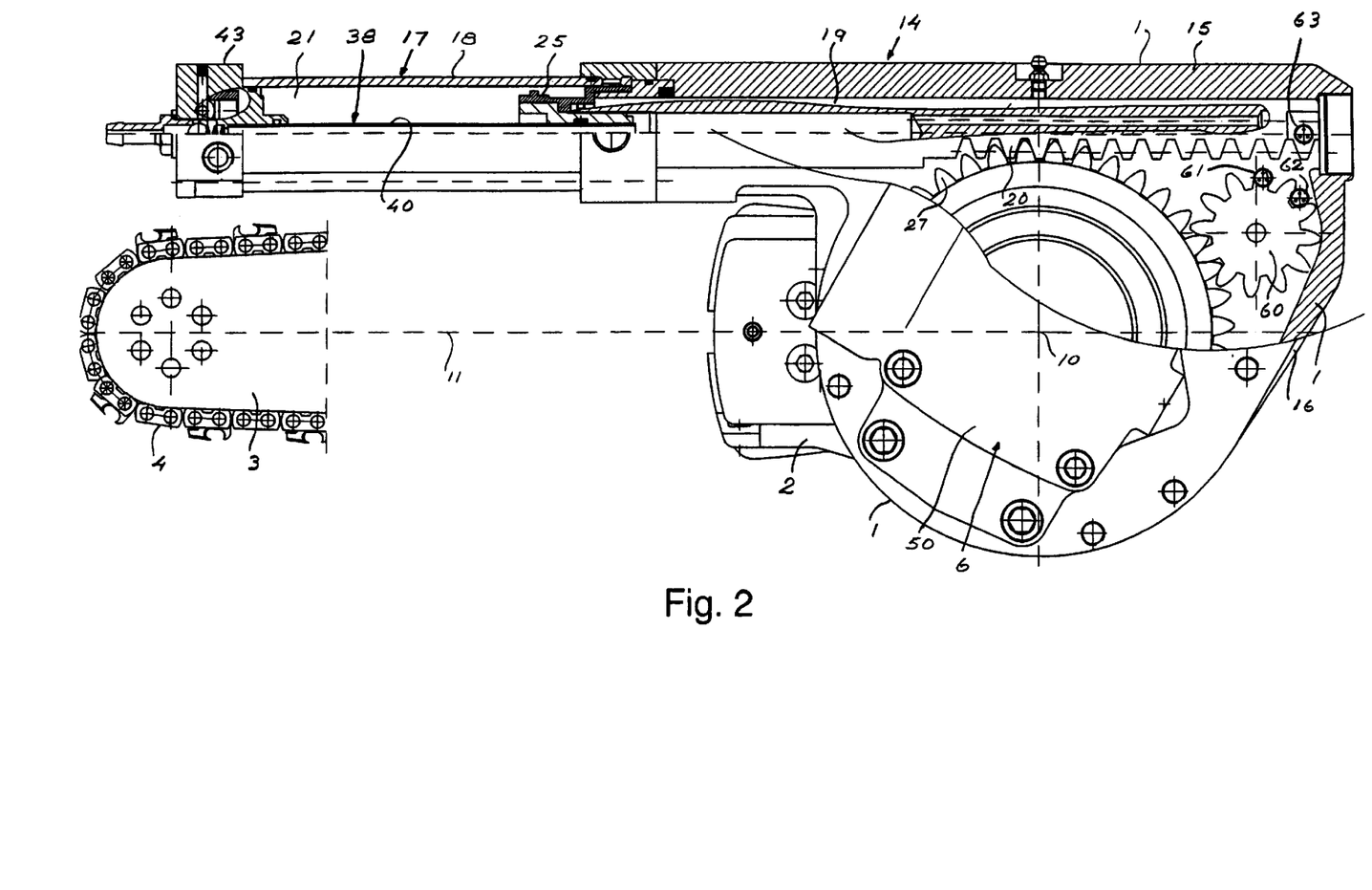
FIG. 2 shows the saw assembly according to FIG. 1 more in section.
Figure 3:
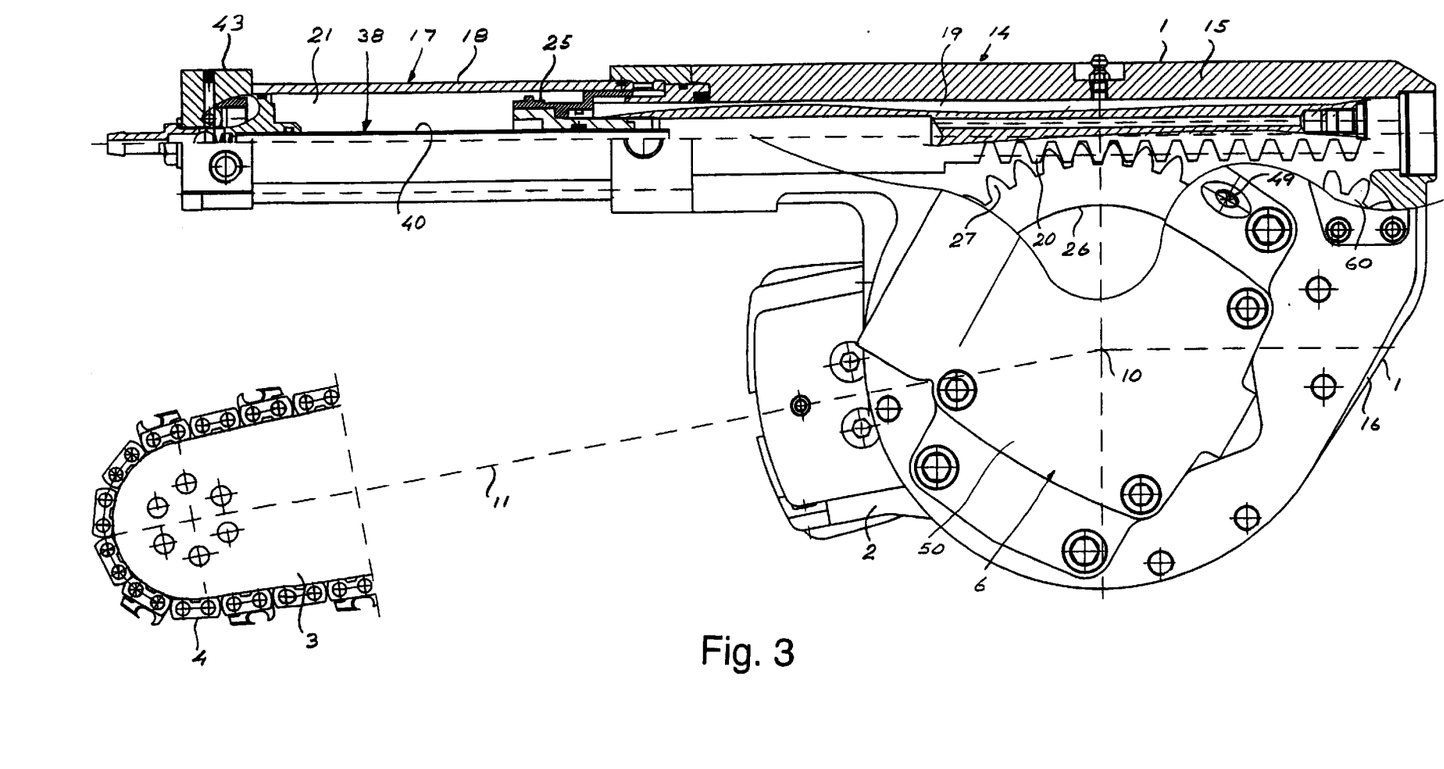
FIG. 3 shows the saw assembly according to FIG. 1 with its saw bar in fed-out position.
Figure 4:
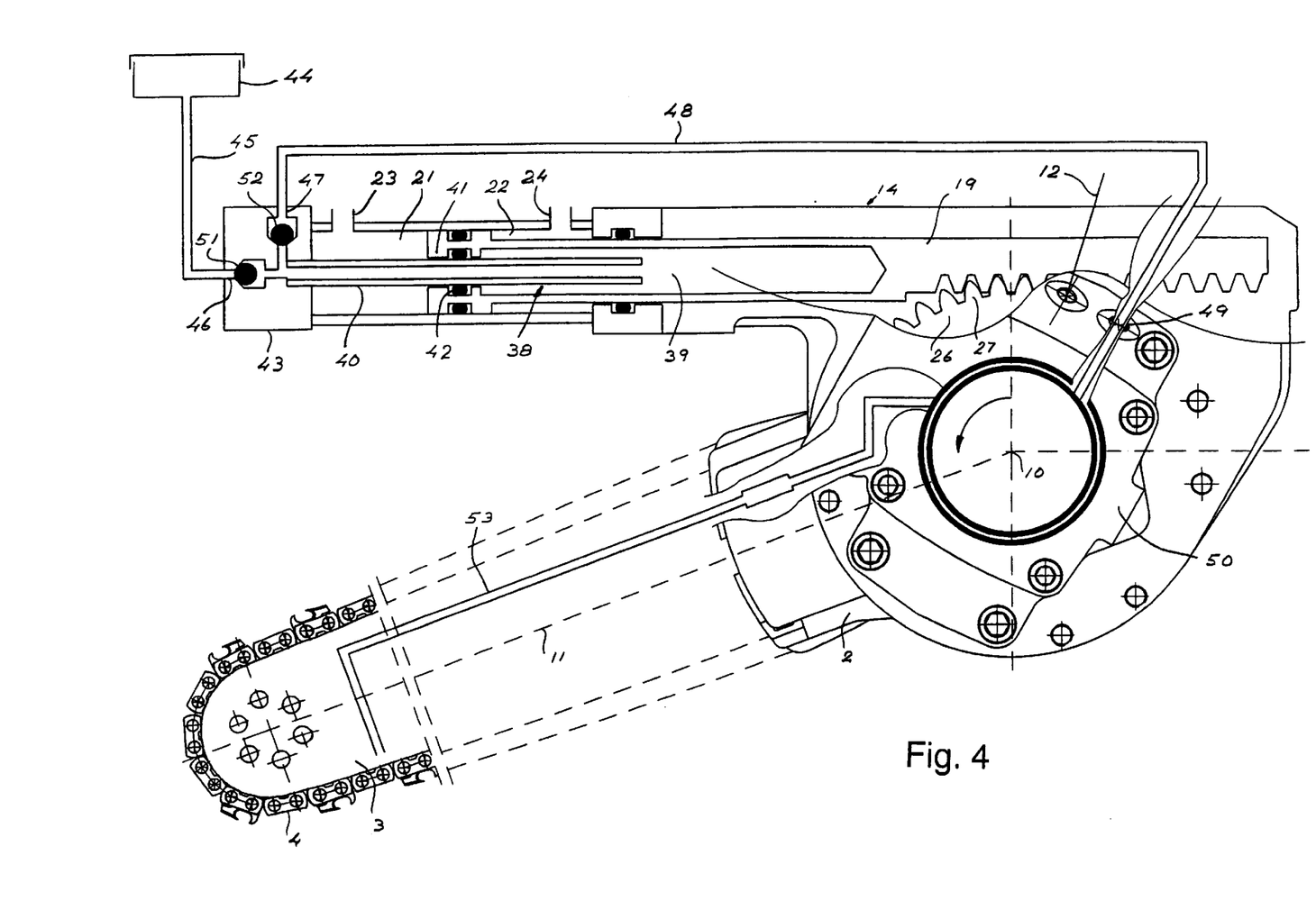
FIG. 4 shows the saw assembly according to FIG. 1 and illustrates its feeding-out and feeding-in device for the saw bar, and also a built-in lubricating oil pump.
Figure 5:
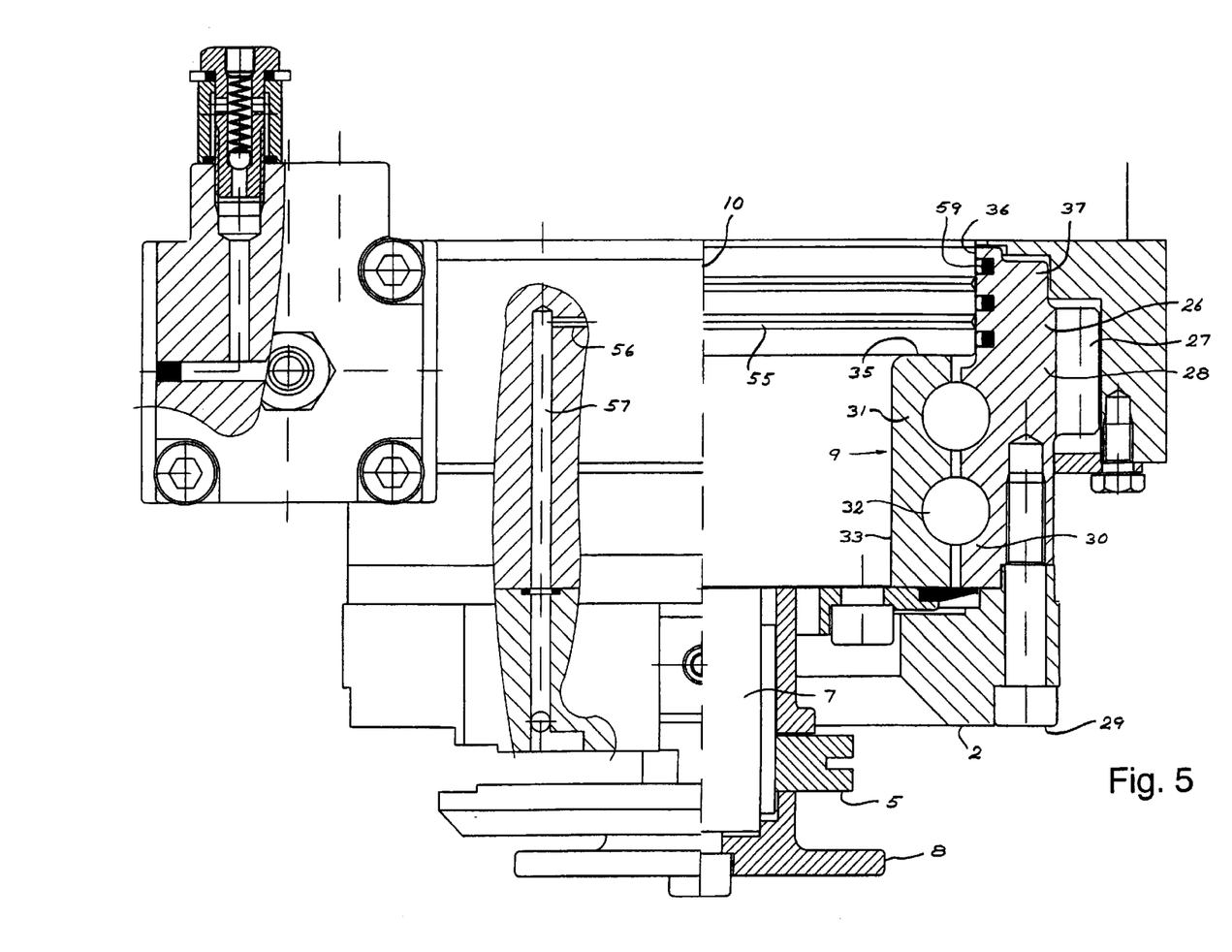
FIG. 5 is a view of the saw assembly according to FIG. 1 seen from one end, partially in section.
Figure 6:
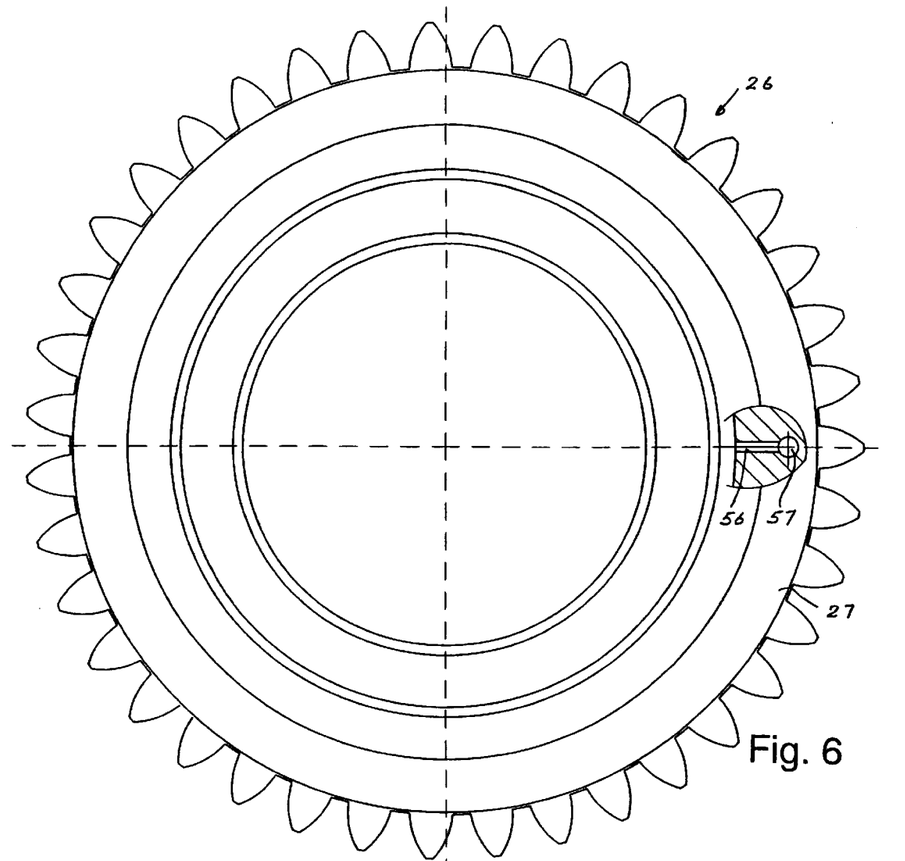
FIGS. 6 and 7 show a top view and a side view, respectively, of a toothed wheel and bearing means of the saw assembly according to FIG. 1.
Figure 7:
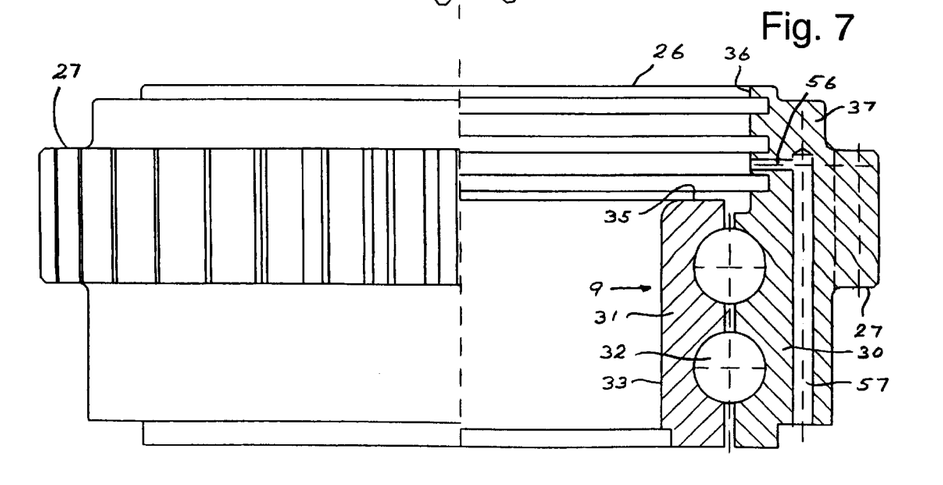
Figure 8:
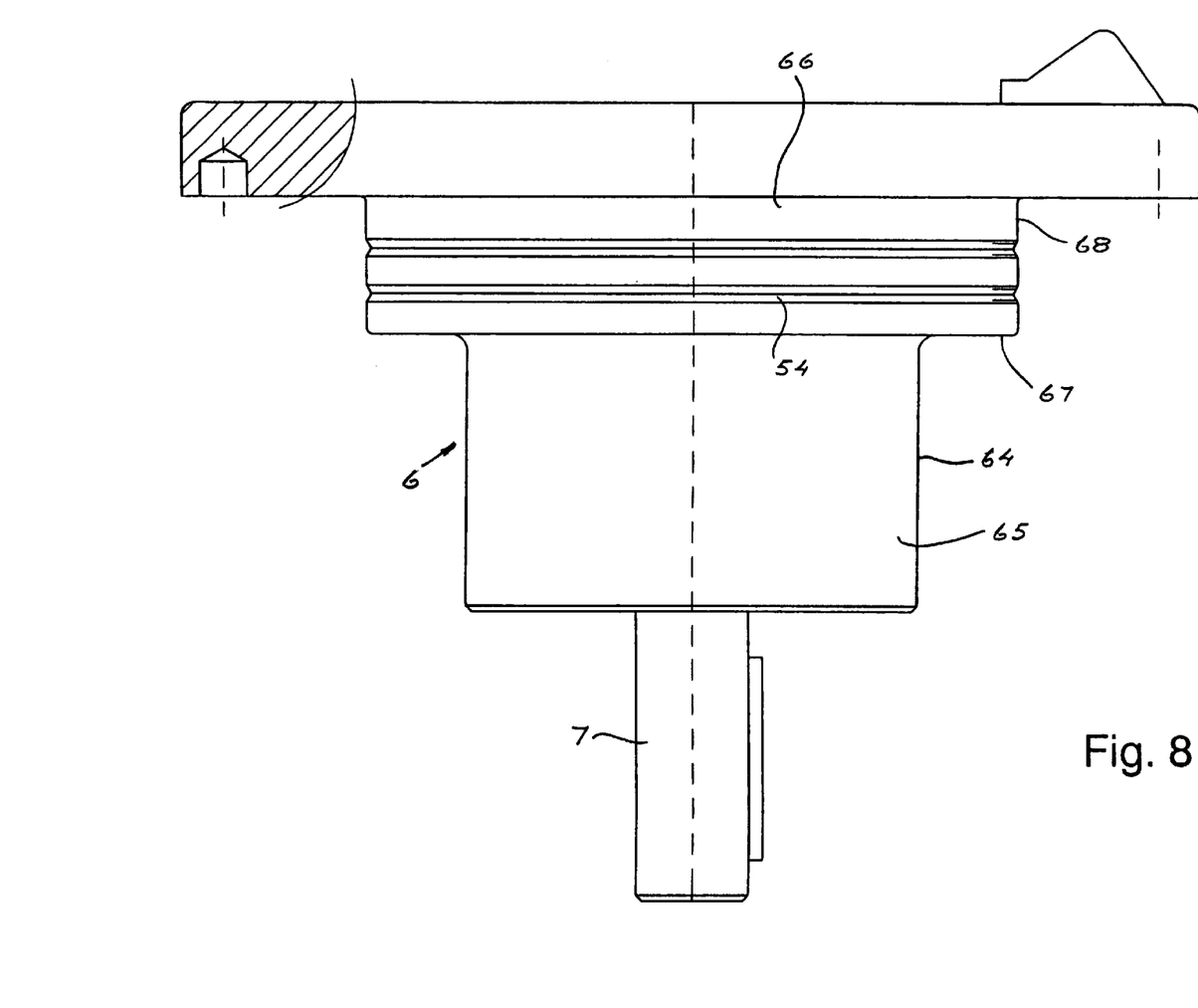
FIGS. 8 and 9 show top and side views, respectively, of a saw motor included in the saw assembly according to FIG. 1.
Figure 9:
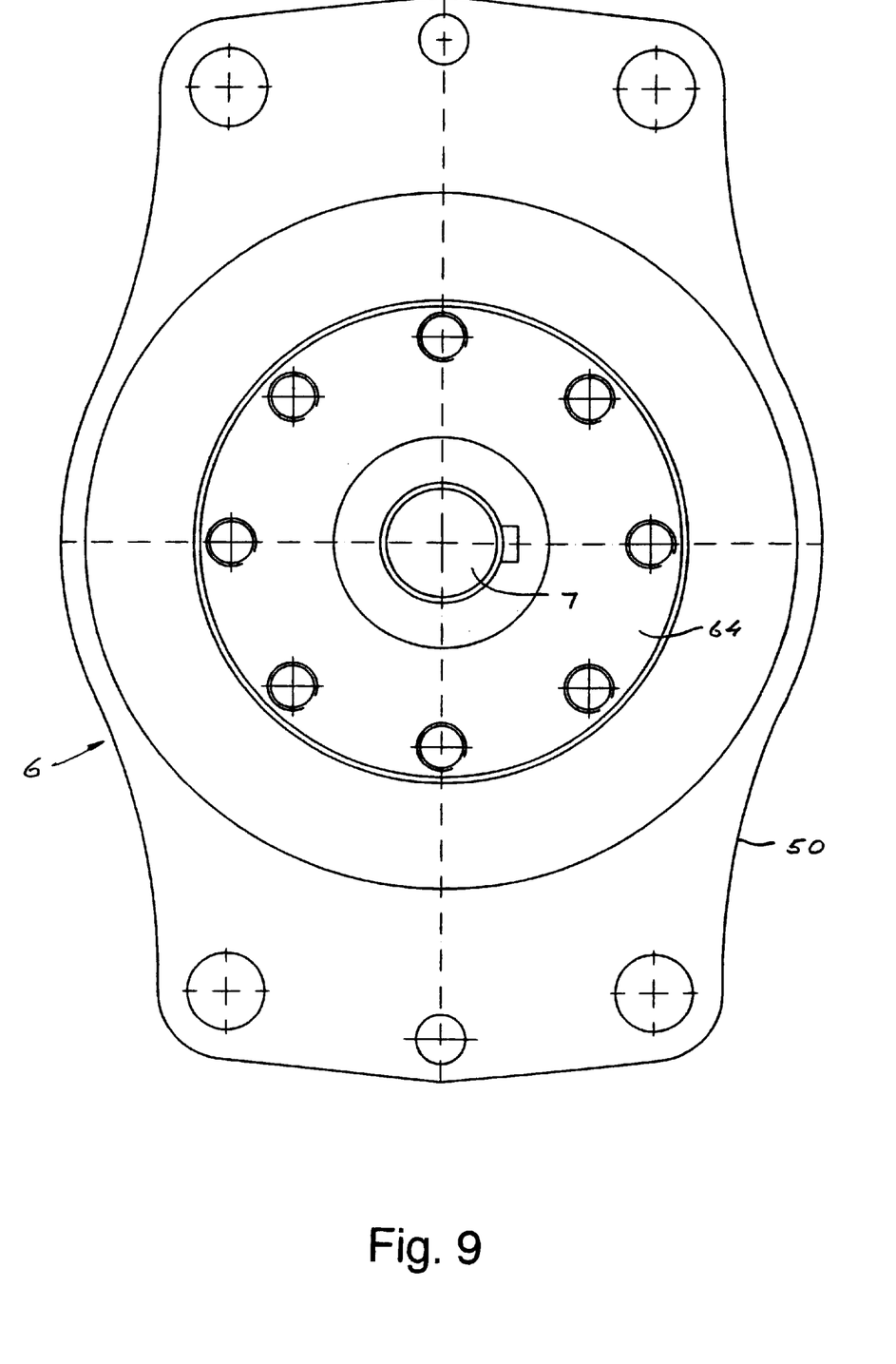

FIGS. 1–5 show schematically parts of a saw assembly mounted in a so-called saw box, which is intended for inclusion in a grip-harvester. The saw assembly comprises a stand 1, a bar holder 2 and a bar 3 mounted on the bar holder 2 with the aid of suitable bar attachments and assembly devices so that a displaceable unit is formed including said bar 3. A saw chain 4 runs around the bar 3 and a chain sprocket 5 (see FIG. 5), which is driven by a saw motor 6 (see FIG. 8) via a drive shaft 7 (see FIG. 5) which also carries a chain guard 8. The saw motor 6 is rigidly secured inside the stand 1. The bar holder 2 is pivotably journalled in relation to the stand 1 by bearing means 9 (see FIG. 5), to be turned in controlled manner about an axis 10 coinciding with the central axis of the drive shaft 7 of the saw motor 6.

Said unit is thus mounted on the bar holder 2 so that the bar 3 can be displaced in relation to this in a direction corresponding to the longitudinal centre line 11 of the bar 3 and which is perpendicular to said axis of pivot 10. A first hydraulic piston cylinder (not shown) is arranged in one of said bar attachments to be activated by a hydraulic circuit system of the saw assembly via a directional valve and a connection comprising an outer pipe 12 (see FIG. 4) for displacement of the unit in relation to the bar holder 2 so that, during operation of the saw assembly, the bar 3 in the unit automatically keeps the saw chain 4 taut. A second hydraulic piston cylinder (not shown) is arranged in one of the bar attachments to act in parallel with the axis of pivot 10 in order to press against the bar holder 2 in a controlled manner to flexibly secure the movable unit to the bar holder 2. The other piston cylinder is also affected by the pressure in said hydraulic circuit system via said outer pipe 12.

The saw assembly comprises a device 14 for controlled feeding of the bar 3 out and in by turning the bar holder 2 about the axis of pivot 10. The stand comprises an oblong side part 15, situated tangentially in relation to the central stand part 16, in which the saw motor 6 is situated. The feeding-out and feeding-in device 14 comprises a hydraulic cylinder 17 which is coaxially rigidly mounted on one end of the oblong stand side part 15. The piston cylinder 18 of the hydraulic cylinder is situated behind the bar 3, seen in its direction of movement, and parallel to the bar 3 when this is in its initial position prior to a sawing operation. The piston rod 19 of the hydraulic cylinder is situated in the stand side part 15 and is shaped as a rack, its side facing the axis of pivot 10 being provided with a section having a plurality of teeth 20—twelve teeth in the embodiment shown. Hydraulic fluid is supplied to and removed from the two pressure chambers 21, 22 (see FIG. 4) of the piston cylinder 18 via pipes 23, 24 connected to the hydraulic circuit system of the saw assembly via a directional valve (not shown), which pressure chambers 21, 22 are defined by a piston 25 carried by the rack 19. The feeding-out and feeding-in device 14 also comprises a toothed wheel 26 with a rim 27, with which the rack 19 of the hydraulic cylinder is in engagement. The toothed wheel 26 has a cylindrical body 28 (see FIG. 5) and is rigidly joined to the bar holder 2 to form a unit therewith which can be turned about said axis of pivot 10. The rigid connection is achieved by means of axial bolts 29 (see FIG. 5) which are screwed into the lower part of the toothed wheel body 28 and which extend through borings in the peripheral part of the bar holder 2. Said bearing means 9, which enables turning of the bar holder 2, is situated within the area, i.e. within the axial extension of the toothed wheel 26. The bearing means 9 consists of a ball bearing with an outer bearing ring 30 formed by the radially inner part of the toothed wheel 26, and an inner bearing ring 31 with which the saw motor 6 is joined to form a rigid unit, i.e. so that the inner bearing ring 31 cannot be turned about the axis of pivot 10. Between them the bearing rings 30, 31 carry balls 32 in two tracks, the ball races being out of round so that the ball bearing functions as a four-point bearing. The inner surface 33 of the inner bearing ring 31 is cylindrical and forms an assembly support for the corresponding externally cylindrical surface 64 of a longitudinally extending assembly shaft 65 of the saw motor 6 (see FIG. 8), the saw motor having an inner radial flange 66, the lower side 67 of which rests on the radial upper surface 35 of the inner bearing ring 31, and the peripheral axial surface 68 of which cooperates with an inner opposite axial surface 36 of the upper part 37 of the toothed wheel body 28.

The saw assembly also comprises a lubricating oil pump 38 (see FIG. 4), arranged to provide the saw chain 4 with lubricating oil when the bar 3 is fed out. In the embodiment shown the lubricating oil pump is built into the hydraulic cylinder 17 itself in order to form an integrated unit therewith and be served thereby. The lubricating oil pump 38 comprises a central, longitudinally extending pump chamber 39 (see FIG. 4) inside the rack 19 in the part facing the piston cylinder 18, and also a central pipe 40 extending through the piston cylinder 18 and into said pump chamber 39 so that one end is always situated in the pump chamber 39. The pump chamber 39 is closed off from the pressure chamber 21 of the hydraulic cylinder 17 by means of suitable sealing elements 41 comprising a sealing ring 42. The hydraulic cylinder 17 is closed at the end facing away from the piston rod 19 by means of a valve housing 43 in which said central pipe 40 extends for rigid assembly therein. The pump chamber 39 is supplied with lubricating oil from a lubricating oil tank 44 (see FIG. 4) via an outer pipe 45, a first channel 46 in the valve housing 43 and the central pipe 40. Lubricating oil is pumped out from the pump chamber 39 via the central pipe 40, a second channel 47 in the valve housing 43 and an outer pipe 48 connected to an inlet 49 in the cover 50 of the saw motor. The first and second channels 46, 47 in the valve housing 43 are provided with non-return valves 51, 52, respectively. It will be understood that lubricant is pumped out of the pump chamber 39 when the piston rod 19 is moved towards the valve housing 43 in order to commence a sawing operation, the volume of the pump chamber 39 decreasing as a result of a larger part of the central pipe 40 being located within the pump chamber 39. When the saw bar 3 is returned by the piston rod 19 being moved in the opposite direction, the volume in the pump chamber 39 increases to a corresponding degree since a smaller part of the central pipe 40 is located within the pump chamber 39. Due to the partial pressure now arising in the pump chamber 39 the lubricant will be sucked into the pump chamber 39 from the lubricating oil tank 44 via pipe 45, channel 46 with its opened non-return valve 51 and the central pipe 40.

From the inlet 49 the lubricant is conveyed to the saw chain 4 via connections in the saw motor 6, toothed wheel 26, holder 2 and a conduit 53 having its orifice close to the saw chain 4. Said connections comprise a circular channel formed by opposing grooves 54, 55 in the flange of the saw motor 6 and the toothed wheel 26, a channel (not shown) in the saw motor 6, which connects said inlet 49 with said circular channel, and radial and axial channels 56, 57 which connect the circular channel 54 with said conduit 53 with its orifice close to the saw chain 4.

Between them the flange of the saw motor 6 and the toothed wheel 26 define a second similar circular channel in order to provide said hydraulic piston cylinders with pressure oil via similar axial and horizontal channels in the saw motor 6, toothed wheel 26 and holder 2 from an inlet 49 in the motor cover 50. The circular channels are sealed by means of sealing rings 59 inserted in peripheral grooves.

The saw assembly also comprises a special device for sensing and recording the angular position and, in the embodiment shown, also the direction of movement of the saw bar 3 in relation to its home position. This device comprises a small toothed wheel 60 (see FIG. 2) which is in toothed engagement with the toothed wheel 26 of the feeding-out and feeding-in device 14 and two sensors 61, 62 one of which, in the starting position of the saw bar 3, is situated immediately opposite a gap between two teeth, whereas the other is situated immediately opposite a tooth. The small toothed wheel 60 is considerably smaller than the toothed wheel 26 of the feeding-out and feeding-in device 14 so that a large gear ratio is obtained which, in the embodiment shown, is 3.25:1. A slight rotation of the saw bar 3 thus gives a large movement on the small toothed wheel 60, which movement is sensed by the sensors 61, 62 which create pulse trains which are recorded and processed by a computer. The arrangement with two toothed wheels 26, 60 with large gear ratio and sensors 61, 62 enables extremely small angular movements of the holder 2 to be sensed and recorded with a sensor system, i.e. an angular movement of 2°. This should be compared with known arrangements where only 7° can be sensed and recorded. A sensor 63 is also provided which senses the home position of the piston rod 19 in order to indicate the home position of the saw bar 3. One of the two sensors 61, 62 may be omitted if information concerning the direction of movement of the saw bar is unnecessary. In certain cases it is sufficient if said gear ratio is 1.5:1 or more. It is valuable to utilize the small angular movements to initiate marking of the sawn cut surface with a marking liquid which must be sprayed out at an exact moment in the sawing operation, when the bar has assumed a specific position in the first part of the saw cut. Start and stop signals for the supply of liquid are controlled by means of electronic signals from a control device with an electronic sensor system comprising said sensors 61 or 62 which sense the angular position of the bar holder 2 in relation to the stand 1, and a sensor on the gripping arms, for instance, which senses the diameter of the tree and is arranged on the saw assembly.

What is claimed is:

1. A saw assembly for a grip-harvester, comprising:
   a stand;

a saw bar;

a chain sprocket;

a said saw chain running around said bar and said chain sprocket;

a bar holder pivotably journalled on said stand;

a saw motor driving said chain sprocket;

a hydraulic cylinder mounted on said stand and having a piston rod and a connection to said bar holder so as to move said saw bar in and out to perform a sawing operation;

wherein said connection comprises a first toothed wheel pivotably journalled in said stand, and coaxially, rigidly joined to said bar holder, at least a sector of a first toothed wheel rim mounted level with and facing said piston rod;

said piston rod including a rack with teeth facing said first toothed wheel and in engagement with said teeth on said at least a sector of said rim; and a device for sensing and recording angular position of said saw bar in relation to an initial position, said sensing and recording device comprising a second toothed wheel which is smaller than and is in toothed engagement with said first toothed wheel so that a gear ratio of >1 is obtained, and said sensing and recording device including at least one sensor which, in said initial position of said saw bar, is positioned immediately opposite a gap between two teeth or immediately opposite a tooth in said second toothed wheel.

2. A saw assembly as claimed in claim 1 wherein the gear ratio between said first and second toothed wheels is greater than 1.5:1.

3. A saw assembly as claimed in claim 1 wherein the gear ratio between said first and second toothed wheels is greater than 3:1.

4. A saw assembly as claimed in claim 1 further comprising a bearing positioned within an axial extension of said first toothed wheel to permit turning of said bar holder.

5. A saw assembly as claimed in claim 4, wherein said bearing comprises a ball bearing with an outer bearing ring formed by a radially inner part of said first toothed wheel, and an inner bearing ring joined with said saw motor to form a rigid unit fixed on said stand.

6. A saw assembly as claimed in claim 5, wherein an inner surface of said inner bearing ring is cylindrical and forms an assembly support for a corresponding externally cylindrical surface of a longitudinally extending assembly shaft on said saw motor.

7. A saw assembly as claimed in claim 4 wherein the gear ratio between said first and second toothed wheels is greater than 1.5:1.

8. A saw assembly as claimed in claim 4 wherein the gear ratio between said first and second toothed wheels is greater than 3:1.

9. A saw assembly as claimed in claim 5 wherein the gear ratio between said first and second toothed wheels is greater than 3:1.

10. A saw assembly as claimed in claim 1 wherein said sensing device also senses and records direction of movement of said saw bar, said sensing and recording device comprising two sensors one of which in said initial position of said saw bar is positioned immediately opposite a gap between two teeth, and the other immediately opposite a tooth, on said second toothed wheel.

11. A saw assembly as claimed in claim 10 wherein the gear ratio between said first and second toothed wheels is greater than 1.5:1.

12. A saw assembly as claimed in claim 10 wherein the gear ratio between said first and second toothed wheels is greater than 3:1.

13. A saw assembly as claimed in claim 10 further comprising a bearing positioned within an axial extension of said first toothed wheel to permit turning of said bar holder.

14. A saw assembly as claimed in claim 13, wherein said bearing comprises a ball bearing with an outer bearing ring formed by a radially inner part of said first toothed wheel, and an inner bearing ring joined with said saw motor to form a rigid unit fixed on said stand.

15. A saw assembly as claimed in claim 14, wherein an inner surface of said inner bearing ring is cylindrical and forms an assembly support for a corresponding externally cylindrical surface of a longitudinally extending assembly shaft on said saw motor.

16. A saw assembly as claimed in claim 1 further comprising: a lubricating oil pump built into said hydraulic cylinder to form an integrated unit therewith; said lubricating oil pump comprising a central, longitudinally extending pump chamber inside said piston rod rack; a central pipe extending through said hydraulic cylinder and into said pump chamber so that one end thereof is always situated in said pump; wherein said pump chamber and pressure chambers of said hydraulic cylinder are separated from each other by a plurality of sealing elements; and wherein said pump chamber communicates with a conduit via said central pipe so that a connection to said saw motor, first toothed wheel, and bar holder are provided in order to supply lubricating oil to said saw chain when volume in said pump chamber decreases.

17. A saw assembly as claimed in claim 16 wherein the gear ratio between said first and second toothed wheels is greater than 3:1.

18. A saw assembly as claimed in claim 16 further comprising a bearing positioned within an axial extension of said first toothed wheel to permit turning of said bar holder.

* * * * *